3,179,601
POLYMERIZATION INITIATORS

Joseph T. Kummer, Midland, Mich., assignor to The Dow Chemical Company, Midland, Mich., a corporation of Delaware
No Drawing. Filed Aug. 24, 1960, Ser. No. 51,480
6 Claims. (Cl. 252—441)

This invention relates to novel initiators for addition polymerization of polymerizable organic compounds having carbon-to-carbon unsaturation and particularly to pyrophoric pulverulent solid products of reaction of magnesium vapor with vapors of a vaporizable titanium compound.

In general, the initiators of this invention are prophoric, finely divided solid products containing magnesium and titanium and are products of reaction of vapors of molten magnesium with vapors of titanium compounds such as titanium tetrachloride and/or titanium tetrabromide, optionally in the presence of a diluent gas substantially inert to magnesium under the operational conditions, such as hydrogen or a noble gas.

The initiators of this invention and the manner of making the same are illustrated by the following example.

Argon was bubbled at a rate of approximately one cubic foot per minute through titanium tetrachloride at room temperature and the resulting vapors were passed into admixture with the vapors of magnesium in the space above a pool of molten magnesium held in a heated crucible. The resulting gas stream containing the products of the vapors of titanium tetrachloride with the vapors of molten magnesium was conducted to a cooling and electrostatic precipitation chamber. A brown pyrophoric solid powder was collected. Analysis of the powder product showed the presence of magnesium and titanium in atomic ratio of 5 to 1 and chlorine. The specific surface area of the powder was approximately 44 square meters per gram.

When molten titanium tetrabromide is used in place of titanium tetrachloride, similar results are obtained except that the resulting pulverulent solid product contains bromine instead of clorine. Mixtures of titanium chlorides and bromides and other vaporizable compounds of titanium can also be used. Instead of argon, another noble gas, i.e. a gas of the zero group of the Periodic Arrangement of the Elements, or hydrogen can be used with substantially the same results, or the reactant vapors can be mixed directly in the absence of an inert diluent.

The precise chemical structure of the pyrophoric pulverulent solid reaction product is not known. Without being bound thereby, it may be hypothesized that elemental magnesium in the vapor state reacts with the titanium compound in the vapor state, e.g. titanium tetrachloride or tetrabromide, to form a magnesium halide and a titanium compound of reduced valency, or it may be that a new chemical complex magnesium titanium compound is formed, or it may be that a unique mixture of products or physical arrangement thereof occurs in the reaction product. The ratio of magnesium to titanium in such product is variable and not critical and so is the kind and proportion of other moiety, e.g. the halogen, arising from the vaporizable titanium starting material.

The pyrophoric solid reaction products above described are useful initiators of addition polymerization of polymerizable organic compounds having carbon-to-carbon unsaturation, such as ethylene or propylene.

For example, when the brown powder product of the above-described reaction between vapors of titanium tetrachloride and vapors of magnesium was exposed to ethylene gas at room temperature and atmospheric pressure, there was formed a high molecular weight, crystalline polymer of ethylene melting at 138° C.

This effect of the described magnesium-titanium-chloride reaction product in initiating low temperature, low pressure polymerization of ethylene to a high molecular weight linear polymer is surprising in view of the fact that ordinary halides of magnesium or of titanium do not initiate such polymerization.

The polymerization initiators of this invention can also be used while suspended in inert liquid media such as hydrocarbons or while deposited or supported on solid carriers and can be promoted by addition of compounds having a metal-hydrocarbon bond, particularly such compounds of group I, II, and III metals, such as aluminum alkyls.

What is claimed is:

1. As an addition polymerization initiator, a pyrophoric pulverulent solid containing magnesium, titanium and halogen and which is the reaction product of the method comprising the steps of conducting a gas consisting essentially of an inert carrier gas and vapors of a member of the group consisting of titanium tetrachloride, titanium tetrabromide, and mixtures of titanium tetrachloride and titanium tetrabromide into reactive admixture with vapors of magnesium over a pool of molten magnesium in a reaction zone, conducting the resulting vaporous reaction mixture and entrained reaction products from the reaction zone into a cooling and precipitation zone, and collecting therefrom the pyrophoric pulverulent solid reaction product containing magnesium, titanium and halogen selected from the group consisting of chlorine, bromine and mixtures of chlorine and bromine corresponding to the starting titanium compound.

2. An addition polymerization initiator, a pyrophoric pulverulent solid containing magnesium, titanium and chlorine and which is the reaction product of the method comprising the steps of conducting a gas consisting essentially of argon and vapors of titanium tetrachloride into reactive admixture with vapors of magnesium over a pool of molten magnesium in a reaction zone, conducting the resulting vaporous reaction mixture and entrained reaction products from the reaction zone into a cooling and precipitation zone, and collecting therefrom the pyrophoric pulverulent solid reaction product containing magnesium, titanium and chlorine.

3. As an addition polymerization initiator, a pyrophoric pulverulent solid containing magnesium, titanium and bromine and which is the reaction product of the method comprising the steps of conducting a gas consisting essentially of argon and vapors of titanium tetrabromide into reactive admixture with vapors of magnesium over a pool of molten magnesium in a reaction zone, conducting the resulting vaporous reaction mixture and entrained reaction products from the reaction zone into a cooling and precipitation zone, and collecting therefrom the pyrophoric pulverulent solid reaction product containing magnesium, titanium and bromine.

4. A method of making an addition polymerization initiator comprising the steps of conducting a gas consisting essentially of an inert carrier gas and vapors of a member of the group consisting of titanium tetrachloride, titanium tetrabromide, and mixtures of titanium tetrachloride and titanium tetrabromide into reactive admixture with vapors of magnesium over a pool of molten magnesium in a reaction zone, conducting the resulting vaporous reaction mixture and entrained reaction products from the reaction zone into a cooling and precipitation zone, and collecting therefrom a pyrophoric pulverulent solid reaction product containing magnesium, titanium and halogen selected from the group consisting of chlorine, bromine and mixtures of chlorine and bromine corresponding to the starting titanium compound.

5. A method of making an addition polymerization initiator comprising the steps of conducting a gas consisting essentially of argon and vapors of titanium tetrachloride into reactive admixture with vapors of magnesium over a pool of molten magnesium in a reaction zone, conducting the resulting vaporous reaction mixture and entrained reaction products from the reaction zone into a cooling and precipitation zone, and collecting therefrom a pyrophoric pulverulent solid reaction product containing magnesium, titanium and chlorine.

6. A method of making an addition polymerization initiator comprising the steps of conducting a gas consisting essentially of argon and vapors of titanium tetrabromide into reactive admixture with vapors of magnesium over a pool of molten magnesium in a reaction zone, conducting the resulting vaporous reaction mixture and entrained reaction products from the reaction zone into a cooling and precipitation zone, and collecting therefrom a pyrophoric pulverulent solid reaction product containing magnesium, titanium and bromine.

References Cited by the Examiner

UNITED STATES PATENTS 2,205,854   6/40   Kroll _____ 23—87

FOREIGN PATENTS 757,873   12/54   Great Britain.

MAURICE A. BRINDISI, *Primary Examiner.*

JULIUS GREENWALD, *Examiner.*